United States Patent
Dumont et al.

(10) Patent No.: US 10,550,034 B2
(45) Date of Patent: *Feb. 4, 2020

(54) DECORATIVE GLASS PANEL

(71) Applicant: AGC GLASS EUROPE, Louvain-La-Neuve (BE)

(72) Inventors: Jacques Dumont, Bioul (BE); Jean-Michel Depauw, Brussels (BE)

(73) Assignee: AGC GLASS EUROPE, Louvain-La-Neuve (BE)

( * ) Notice: Subject to any disclaimer, the term of this patent is extended or adjusted under 35 U.S.C. 154(b) by 113 days.

This patent is subject to a terminal disclaimer.

(21) Appl. No.: 15/324,175

(22) PCT Filed: Jul. 15, 2015

(86) PCT No.: PCT/EP2015/066140
§ 371 (c)(1),
(2) Date: Jan. 5, 2017

(87) PCT Pub. No.: WO2016/012325
PCT Pub. Date: Jan. 28, 2016

(65) Prior Publication Data
US 2017/0197874 A1  Jul. 13, 2017

(30) Foreign Application Priority Data

Jul. 25, 2014  (EP) .................................... 14178596

(51) Int. Cl.
C03C 17/36  (2006.01)

(52) U.S. Cl.
CPC ........ C03C 17/3649 (2013.01); C03C 17/366 (2013.01); C03C 17/3639 (2013.01); C03C 17/3681 (2013.01); C03C 17/3684 (2013.01); C03C 2217/212 (2013.01); C03C 2217/252 (2013.01); C03C 2217/258 (2013.01); C03C 2217/268 (2013.01); C03C 2217/281 (2013.01); C03C 2217/72 (2013.01); C03C 2218/156 (2013.01)

(58) Field of Classification Search
CPC ............ C03C 17/3649; C03C 17/3684; C03C 2217/72; C03C 17/3639
See application file for complete search history.

(56) References Cited

U.S. PATENT DOCUMENTS

| | | | | |
|---|---|---|---|---|
| 3,272,986 A * | 9/1966 | Schmidt | .................. | F24S 70/25 136/206 |
| 4,725,710 A * | 2/1988 | Ramus | .............. | B32B 17/10174 219/203 |
| 4,902,581 A * | 2/1990 | Criss | ........................ | C03C 17/36 428/627 |
| 5,566,011 A * | 10/1996 | Steigerwald | ...... | G02F 1/133512 349/110 |
| 5,688,585 A * | 11/1997 | Lingle | ..................... | C03C 17/36 428/216 |
| 5,714,268 A * | 2/1998 | Anderson | ............... | C03C 17/09 359/360 |
| 5,939,201 A * | 8/1999 | Boire | ..................... | C03C 17/002 359/839 |
| 6,159,607 A * | 12/2000 | Hartig | .................. | C03C 17/3435 428/426 |
| 6,285,424 B1 * | 9/2001 | Yoshida | .................. | G02B 5/201 349/110 |
| 6,335,142 B1 * | 1/2002 | Quesnel | ................... | G02B 5/22 430/271.1 |
| 6,650,478 B1 * | 11/2003 | DeBusk | .................. | C03C 17/36 359/359 |
| 7,041,376 B2 * | 5/2006 | Shimatani | ............ | C03C 17/3435 428/432 |
| 2002/0192473 A1 * | 12/2002 | Gentilhomme | ..... | C03C 17/3435 428/432 |
| 2003/0017316 A1 * | 1/2003 | Pfaff | ........................ | A61K 8/19 428/212 |

(Continued)

FOREIGN PATENT DOCUMENTS

FR   2 862 961 A1   6/2005
JP   08048545 A   *   2/1996   .........   C03C 17/3435

(Continued)

OTHER PUBLICATIONS

EPO Translation of WO 2012/013787 (Year: 2018).*
Smith, D et al., The Optical Properties of Metallic Aluminum, Handbook of Optical Constants of Solids, p. 369, 1985.*
Table of contents from The Optical Properties of Metallic Aluminum.*
International Search Report dated Oct. 7, 2015 in PCT/EP15/066140 Filed Jul. 15, 2015.

Primary Examiner — Z. Jim Yang
(74) Attorney, Agent, or Firm — Oblon, McClelland, Maier & Neustadt, L.L.P.

(57) ABSTRACT

The invention relates to an almost opaque decorative glass panel comprising a substrate made of a vitreous material bearing a multilayer stack including at least one light-absorbing functional layer and transparent dielectric coatings such that the light-absorbing functional layer is enclosed between dielectric coatings. The light-absorbing functional layer has a geometric thickness comprised between 25 and 140 nm, and an extinction coefficient k of at least 1.8. The multilayer stack in addition comprises at least one attenuating layer placed between the substrate and the light-absorbing functional layer, having a thickness comprised between 1 and 50 nm, having a refractive index n higher than 1 and an extinction coefficient k of at least 0.5. Furthermore, a transparent dielectric coating the optical thickness of which is comprised between 30 and 160 nm, and the refractive index n of which is higher than 1.5, is placed adjacent to the attenuating layer on the side opposite the light-absorbing functional layer. The invention provides a decorative panel offering a pleasant aesthetic effect.

20 Claims, 1 Drawing Sheet

(56) References Cited

U.S. PATENT DOCUMENTS

| | | | |
|---|---|---|---|
| 2003/0116551 A1* | 6/2003 | Sol | B32B 17/10036 219/203 |
| 2004/0053068 A1* | 3/2004 | Schicht | C03C 17/36 428/627 |
| 2004/0161616 A1* | 8/2004 | Neuman | C03C 17/3435 428/432 |
| 2004/0214014 A1* | 10/2004 | Lin | C03C 17/225 428/426 |
| 2005/0172829 A1* | 8/2005 | Shimatani | C03C 17/06 99/403 |
| 2005/0238885 A1* | 10/2005 | Takeda | C09D 11/03 428/426 |
| 2006/0018050 A1* | 1/2006 | Okami | G02B 5/22 359/888 |
| 2006/0088773 A1* | 4/2006 | Bellman | C03C 17/36 430/5 |
| 2006/0110587 A1* | 5/2006 | Okami | G02B 5/205 428/216 |
| 2006/0159933 A1* | 7/2006 | Disteldorf | C03C 17/3435 428/432 |
| 2007/0082219 A1 | 4/2007 | Fleury et al. | |
| 2007/0166630 A1* | 7/2007 | Kim | C03C 17/36 430/5 |
| 2007/0196670 A1* | 8/2007 | Barshilia | C23C 14/568 428/446 |
| 2008/0213555 A1* | 9/2008 | Ono | C23C 14/0036 428/215 |
| 2008/0264931 A1* | 10/2008 | Vilato | C03C 17/00 219/622 |
| 2009/0051860 A1* | 2/2009 | Hiruma | G02B 5/003 349/106 |
| 2009/0257141 A1* | 10/2009 | Yamada | B60J 1/00 359/893 |
| 2010/0035034 A1* | 2/2010 | Yin | C23C 14/0676 428/216 |
| 2010/0255294 A1* | 10/2010 | Yaoita | C03C 17/3435 428/336 |
| 2010/0264130 A1* | 10/2010 | Ikegami | C03C 17/36 219/620 |
| 2011/0027554 A1* | 2/2011 | Gouardes | C03C 17/36 428/213 |
| 2011/0039113 A1* | 2/2011 | Ono | C03C 8/14 428/428 |
| 2011/0146172 A1* | 6/2011 | Mauvernay | C03C 17/3435 52/235 |
| 2011/0236663 A1 | 9/2011 | Fleury et al. | |
| 2012/0125314 A1* | 5/2012 | Alonso Esteban | C03C 17/36 126/211 |
| 2012/0164443 A1* | 6/2012 | Durandeau | C03C 17/3435 428/336 |
| 2012/0177899 A1* | 7/2012 | Unquera | C03C 17/36 428/213 |
| 2012/0225304 A1* | 9/2012 | Imran | C03C 17/36 428/433 |
| 2013/0120842 A1* | 5/2013 | Moens | C03C 17/36 359/585 |
| 2013/0215067 A1* | 8/2013 | Hwang | G02B 5/003 345/173 |
| 2014/0017472 A1* | 1/2014 | Coster | B32B 17/10036 428/219 |
| 2014/0063582 A1* | 3/2014 | Gross | G02B 5/208 359/241 |
| 2014/0144426 A1* | 5/2014 | Cespedes Montoya | C23C 28/321 126/694 |
| 2014/0197152 A1* | 7/2014 | Alonso Esteban | C03C 17/36 219/452.12 |
| 2014/0319116 A1* | 10/2014 | Fischer | H05B 3/84 219/203 |
| 2014/0335349 A1* | 11/2014 | Henn | C03C 17/002 428/332 |
| 2014/0362434 A1* | 12/2014 | Schmitz | H05B 3/84 359/350 |
| 2015/0062709 A1* | 3/2015 | Matsuyuki | C03C 17/3417 359/584 |
| 2015/0064432 A1* | 3/2015 | Matsuyuki | G02B 1/115 428/216 |
| 2015/0125691 A1* | 5/2015 | Mahieu | C03C 17/36 428/336 |
| 2015/0329414 A1* | 11/2015 | De Grazia | C03C 17/3618 428/216 |
| 2016/0002101 A1* | 1/2016 | Mahieu | C03C 17/3618 359/359 |
| 2016/0070033 A1* | 3/2016 | Schlott | C23C 14/08 428/216 |
| 2016/0145151 A1* | 5/2016 | Mahieu | C03C 17/3618 428/213 |
| 2016/0354995 A1* | 12/2016 | Lienhart | B32B 15/04 |
| 2017/0088461 A1* | 3/2017 | Tavares-Cortes | C03C 17/36 |
| 2018/0223418 A1* | 8/2018 | Schlott | C03C 17/36 |

FOREIGN PATENT DOCUMENTS

| | | | |
|---|---|---|---|
| JP | 2009157211 A * | 7/2009 | G02B 5/22 |
| WO | 2012/013787 A2 | 2/2012 | |
| WO | WO-2012013787 A2 * | 2/2012 | C03C 17/36 |
| WO | WO-2012131511 A1 * | 10/2012 | C03C 17/36 |
| WO | WO-2013104438 A1 * | 7/2013 | H05B 3/84 |
| WO | WO-2014063953 A2 * | 5/2014 | C03C 17/3435 |
| WO | 2014/125081 A1 | 8/2014 | |
| WO | 2014/125083 A1 | 8/2014 | |
| WO | 2014/207171 A1 | 12/2014 | |
| WO | WO-2015052440 A1 * | 4/2015 | C03C 17/36 |

\* cited by examiner

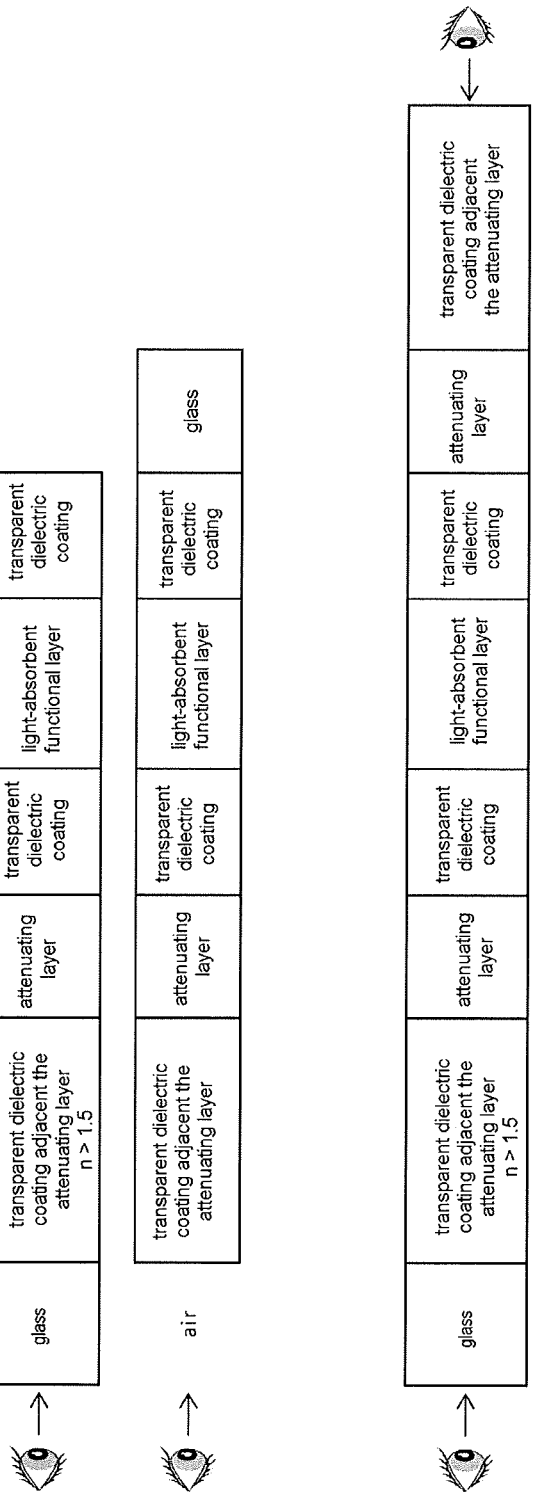

DECORATIVE GLASS PANEL

1. FIELD OF THE INVENTION

The field of the invention is that of decorative glass panels that are opaque or have a very low light transmission and that comprise a substrate made of vitreous material bearing a decorative coating.

These decorative panels have various applications. They are for example used as spandrels (cladding) in the curtain wall of a building to conceal wall sections between the vision-glazing area of two floors of a curtain wall having a uniform "all glass" appearance. They are also used in interior furnishing and to decorate the interior of buildings. They may also be used for displays or in household appliances. They are also used in automotive applications, generally in the form of strips, for example to aesthetically conceal adhesive joints and/or current collectors and electrical connections in heated glazing units such as heated windshields or heated rear windshields, or to conceal electrical connections and/or adhesive joints in solar-control roof glazing units.

This type of decorative panel is generally formed of a sheet made of vitreous material bearing an oven-baked decorative enamel coating. The enamel layer, on the finished product, has a relatively rough surface and its thickness may be relatively great. This is disadvantageous for certain applications and in particular when a thin layer, for example a thin conductive layer and possibly a thin conductive heating layer, must be deposited on the enamel, and particularly if the thin conductive layer must extend beyond the enamel coating.

Furthermore, these enamel layers must be baked in the factory post-deposition on the sheet of vitreous material, which has also possibly received a stack of thin layers. The bake may be carried out in two steps, with a first step of drying and stabilizing the enamel and a curing second step in which, if it is carried out in the factory before dispatch of the panel, a high-temperature heat treatment is carried out. The coated sheet of vitreous material will often have undergone a high-temperature mechanically strengthening heat treatment. This may cause problems as regards the subsequent cutting of the coated substrate. Specifically, it is then difficult, or even impossible, to cut the desired piece from a large coated stock substrate. In addition, when a piece breaks, a new piece must be manufactured in the factory and cannot be cut from a stock of large sheets.

In addition, the formation of the enamel requires a delicate additional operation of enameling followed by baking of the enamel, which may lead to the formation of a porosity that is in particular disadvantageous as regards the ageing of the panel.

The presence of the enamel may also create problems of compatibility and/or chemical reactions with other components of the panel such as mono- or multilayer stacks deposited on the glazing substrate for various purposes. The enamel also influences the hue of the decorative panel and makes it more difficult to obtain the desired hue.

2. SOLUTIONS OF THE PRIOR ART

Solutions have been found to avoid the presence of the enamel. Patent application WO 2012/013787 A2 describes a spandrel provided with a stack of layers formed by cathode sputtering on a glazing substrate. This document discloses almost opaque spandrels that visually match the vision-glazing areas of a building without the use of any enamel layers.

However, there is a demand for decorative panels providing another aesthetic effect.

3. OBJECTIVES OF THE INVENTION

One of the objects of the invention is to provide a decorative panel having a novel and pleasant aesthetic appearance.

Another object of the invention is to provide a decorative panel that is easy to manufacture industrially and that does not require an enameling step.

Another object of the invention is to provide a resistant decorative panel that is able to undergo a heat treatment without significant modification of its optical properties.

4. SUMMARY OF THE INVENTION

The invention relates to an almost opaque decorative glass panel comprising a substrate made of vitreous material bearing a multilayer stack including at least one light-absorbent functional layer and transparent dielectric coatings such that the light-absorbent functional layer is enclosed between dielectric coatings, characterized in that the light-absorbent functional layer has a geometric thickness comprised between 15 and 140 nm, an attenuation coefficient k of at least 1.8 and a product of the attenuation coefficient k by the thickness in nanometers of at least 91, in that the multilayer stack in addition comprises at least one attenuating layer having a thickness comprised between 1 and 50 nm and having a refractive index n higher than 1 and an attenuation coefficient k of at least 0.5, and in that a transparent dielectric coating whose optical thickness is comprised between 30 and 160 nm and whose refractive index n is higher than 1.5, unless it makes contact with air, is placed adjacent the attenuating layer on the side opposite the light-absorbent functional layer.

It has been found that this combination of features with this selection of relatively restricted thickness ranges makes it possible to easily obtain, by judicially choosing the respective thicknesses, a particularly attractive and surprising new aesthetic appearance. Specifically, it is thus possible to easily obtain a panel that, when it is observed from the side of the attenuating layer, has a very low light reflection that may reach values as low as 5% for example and in addition with a black hue. This produces an attractive decorative effect.

This is completely unexpected because the panels of the prior art, in particular those disclosed in the patent application WO 2012/013787 A2 discussed above, all have relatively high external light reflection, of about 15-25%. Specifically, the metal layers, and in particular the relatively thick metal layer that ensures the opacity of the panel, tend to create a "mirror" effect that strongly and specularly reflects light. The invention runs completely contrary to this conventional situation and obtains the inverse effect, namely that of a black absorber, this creating a novel and particularly pleasant aesthetic effect.

5. BRIEF DESCRIPTION OF THE DRAWINGS

The inventions are further illustrated in the following exemplary

FIG. 1 showing different embodiments of the invention in Table A and Table B.

6. DETAILED DESCRIPTION

In the present description, unless otherwise specified, the light transmission $T_L$ and light reflection $R_L$ are measured with illuminant D65, 2°. The CIE colour coordinates L*, a* and b* are measured with illuminant D65, 10°. The angle at which the measurements are taken is 8°.

By "almost opaque panel" or "panel having a very low light transmission" what is meant, in the present description, is that the light transmission through the panel is at most 4%, preferably at most 2%, advantageously at most 1%, and even preferably at most 0.3%. The opacity is obtained by virtue of the multilayer stack, i.e. the values given above are obtained with a substrate formed of an ordinary clear soda-lime glass sheet of 4 mm thickness coated with the multilayer stack.

By "transparent dielectric coating", what is meant is a dielectric coating having an attenuation coefficient k of at most 0.2.

By "attenuating layer", what is meant in the context of the invention is a layer that absorbs part of the visible spectrum and that essentially consists in a material the spectral attenuation coefficient $k(\lambda)$ of which is higher than zero in all the visible wavelength domain (380-780 nm). The mean attenuation coefficient k of this material, in the visible range, the wavelengths of which extend from 350 nm to 750 nm, is at least 0.5, preferably higher than 1.0, advantageously higher than 2 and preferably higher than 3. An exemplary preferred range of values is comprised between 2 and 4 and advantageously between 3 and 4. An attenuating layer having an attenuation coefficient k as low as 0.5-0.7, for example, may be suitable, but, when the attenuation coefficient is this low, it is preferable for the refractive index to be higher than 2.6 and for the thickness of the layer to also be higher than would be the case if the attenuation coefficient were higher, to compensate for the low intrinsic absorption of the material. It is in fact the product of these three parameters that must be sufficient, as will be seen below.

Unless otherwise indicated, the values of the attenuation coefficients k and of the refractive indices n given in the present description are arithmetic means calculated from values obtained over the whole of the visible spectrum for wavelengths $\lambda$ ranging from 350 nm to 750 nm, at regular intervals of 3 nm.

Preferably, the attenuating layer is formed of a material, and possesses a thickness, that are such that the following relationship (product of the values k, n and e) is satisfied:

k×n×e>35, advantageously >40, and preferably >60, in which k is the mean attenuation coefficient such as defined above, n is the mean refractive index such as defined above and e is the geometric thickness of the layer expressed in nm.

The light-absorbent functional layer may be a nitride for example, such as TiN, CrN or another absorbent nitride, or of carbon or a carbon-containing material, provided that it meets the condition on the value of the attenuation coefficient k. Preferably, the light-absorbent functional layer is a layer of metallic character.

By "metallic character" what is meant is a layer formed from a material possessing the generally accepted property that defines a metal. This metal layer may also be slightly nitrided, oxidized or carbidized, provided it does not lose its basic metallic character.

Each constituent layer of the stack (the functional layer, the attenuating layer and the dielectric layers) may be composed of a set of layers allowing the physical-chemical properties of the product (durability, resistance to high-temperature heat treatment, optical stability following a tempering process, ease of manufacture, production, etc.) to be improved.

The light-absorbent functional layer and the attenuating layer are deposited by low-pressure cathode sputtering and preferably low-pressure magnetron cathode sputtering. Either or both may optionally be formed from a plurality of layers of different materials, for example in order to improve chemical or thermal resistance. The attenuation coefficient and refractive index to take into account are then the weighted means of the materials. For example, merely by way of illustration, it is possible to use the following structure, Cr/Ti/Cr, in which Cr in particular protects Ti from oxidation. It is also possible to insert a thin barrier layer at the interface between the attenuating layer or the functional layer and the dielectric coating, and optionally at each interface, in order to ensure a better compatibility at the interface and/or to protect the metal layers, if such is the case, and/or to form a barrier to the diffusion of undesirable impurities (Na, O, $H_2O$, N, C, etc.). For example, at the interface between a metal and $Si_3N_4$, it is possible to insert a thin layer of 5 to 10 nm of $Cr_2O_3$, $Nb_2O_5$, $Hf_2O_3$, $Ta_2O_5$ or NiCrOx.

Preferably, the product of the attenuation coefficient k by the thickness in nm (k×e) of the light-absorbent functional layer is at least 110, advantageously 200 and preferably at least 220. In this way a panel of good opacity is more easily obtained.

Preferably, the attenuation coefficient k of the light-absorbent functional layer is at least 2.5. This makes it easier to obtain an effective opacification with a limited layer thickness.

The light-absorbent functional layer may for example be formed from titanium, chromium, zirconium, molybdenum, silver, aluminum, nickel, copper, niobium, tantalum, palladium, yttrium, tungsten, hafnium, vanadium or alloys thereof, and from CoCr, NiCr, ZrCr, NiCrW, NbCr or stainless steel. As indicated above, these layers may be slightly nitrided, oxidized or carburized, etc. provided that they do not lose their metallic character.

The attenuating layer may for example be formed from titanium, niobium, chromium, molybdenum, zirconium, tantalum, palladium, yttrium, tungsten, hafnium, vanadium or alloys thereof, or from a light-absorbent nitride or oxynitride such as TiN, TaN, CrN, or ZrN, or a light-absorbent oxide such as stainless-steel oxide or iron oxide. Preferably, the attenuating layer is a layer of metallic character. This feature makes it possible to obtain an effective attenuation, over the whole of the visible spectrum, of the light reflected by the light-absorbing functional layer, with an attenuating layer of small thickness.

The main function of the light-absorbent functional layer is to enable a relatively modest thickness to opacify the panel, allowing industrial manufacture at low cost.

Preferably, the geometric thickness of the light-absorbent functional layer is at most 88 nm and preferably at most 80 nm.

Preferably, the light-absorbent functional layer has a geometric thickness comprised between 25 and 88 nm, advantageously comprised between 25 and 80 nm and preferentially comprised between 25 and 75 nm.

Preferably, the geometric thickness of the light-absorbent functional layer is 28 nm or more, advantageously 31 nm or more, and preferably 35 nm or more. A range of thicknesses between 28 and 70 nm for the light-absorbent functional layer promotes the obtainment of a panel having a very low light transmission, i.e. that is opaque or almost opaque, while limiting the production costs thereof. Preferably, the geometric thickness of the light-absorbent functional layer is comprised between 31 and 70 nm and advantageously between 35 and 60 nm.

Preferably, the geometric thickness of the attenuating layer is 40 nm or less, advantageously 30 nm or less, preferably 20 nm or less and more preferably 16 nm or less. An attenuating layer with a thickness comprised between 2 and 12 nm and advantageously between 3 and 10 nm is a particularly highly suitable way of promoting the obtainment of a low substrate-side light reflection with a relatively low total stack thickness.

Preferably, the total thickness of the multilayer stack is at most 400 nm, advantageously at most 300 nm and preferably at most 250 nm.

According to the invention, the attenuating layer is separated from the light-absorbent functional layer by at least one transparent dielectric coating.

When the transparent dielectric coating placed adjacent the attenuating layer on the side opposite the light-absorbent functional layer is deposited directly on the substrate made of vitreous material, i.e. the stack is for example intended to be in position 2 and the panel will therefore be seen from the side of the substrate, the refractive index of this coating must be higher than 1.5. The same goes if this dielectric coating is intended to make contact with the PVB, as for example in a laminated glazing unit. In contrast, if this dielectric coating is intended to make contact with the atmosphere, for example if the stack is placed in position 1 and the panel will therefore be seen from the side of the stack, this dielectric coating may then have a refractive index of 1.5 or very slightly less. Preferably, the transparent dielectric coating placed adjacent the attenuating layer on the side opposite the light-absorbent functional layer has a refractive index n higher than 1.9 and advantageously of 2 or more. These embodiments may for example be as shown in table A in FIG. 1.

Preferably, the optical thickness of the transparent dielectric coating placed adjacent the attenuating layer on the side opposite the light-absorbent functional layer is comprised between 50 and 140 nm, advantageously between 60 and 130 nm, and preferably between 70 and 120 nm. These thickness ranges promote, most particularly in combination with an attenuating layer that is between 2 and 12 nm and advantageously between 3 and to nm in thickness, the obtainment of a very low light reflection observed from the side of the attenuating layer. In particular, it is easily possible to obtain a light reflection of 6% or less and even of 5% or less. Given, for example with regard to the case of a low reflection examined substrate side, that the light reflection of a substrate formed by an ordinary clear glass sheet is about 4%, this means that the light reflection is almost not increased by the multilayer stack, even though the opacity is preferably obtained by a thin metal layer that will tend to create a "mirror" effect. It will be recalled that optical thickness is obtained by multiplying geometric thickness by the refractive index n of the material in question.

Preferably, the attenuating layer is flanked, and makes contact with, two transparent dielectric coatings having similar optical thicknesses that differ by no more than 45 nm and preferably no more than 20 nm. This facilitates the obtainment of a low reflection.

Preferably, the geometric thickness of the light-absorbent functional layer is comprised between 25 and 80 nm, advantageously between 35 and 80 nm and preferably between 25 and 70 nm, the geometric thickness of the attenuating layer is comprised between 1 and 15 nm, and the optical thickness of the dielectric coating placed adjacent the attenuating layer on the side opposite the light-absorbent functional layer is comprised between 40 and 160 nm. This combination of features favours the obtainment of a very low substrate-side light reflection with a neutral hue.

Preferably, the light-absorbent functional layer and/or said attenuating layer is/are formed from an alloy based on Ni, Cr, NiCr or Zr. Advantageously these two layers are based on said alloy. Alloys based on these metals form light-absorbing functional layers and/or attenuating layers capable of undergoing high-temperature heat treatments without significant structural modification.

Preferably, the light-absorbent functional layer and/or said attenuating layer is/are based on an alloy from the group NiCr, NiCrW, NbZr and CrZr, and advantageously, both said layers are based on an alloy from this group. It is thus possible to easily obtain, by judiciously choosing the dielectric coatings, a panel that is able to withstand a high-temperature heat treatment without significant modification of the optical properties thereof. These alloys also favour the obtainment of the pleasant aesthetic effect. Preferably, the light-absorbent metal layers are made of NiCrW, the NiCrW alloy containing 40 to 60% by weight NiCr (nickel/chromium in a proportion of 80/20, respectively) and 60 to 40% by weight tungsten.

Generally, each dielectric coating may comprise a transparent dielectric layer conventionally used in the field, such as, to mention but a few, $TiO_2$, $Si_3N_4$, $SiO_xN_y$, Al(O)N, $Al_2O_3$, $SnO_2$, $ZnAlO_x$, $Zn_2SnO_4$, ITO, a mixed Ti and Zr or Nb oxide, etc. Of course, each dielectric coating may in addition comprise a plurality of dielectric layers of different materials, certain of which layers may be intended to provide a specific particular functionality, such as mechanical and/or chemical protection, or to increase the deposition rate or to prevent crystal growth. Mention may especially be made of a dielectric layer intended to counter the migration of alkali-metal ions originating from the glass, for example an $SiO_2$ layer or a final protective layer formed from a mixed titanium zirconium oxide. The optical thickness of the dielectric coating is the sum of the optical thicknesses of each of the constituent dielectric layers thereof.

Because its refractive index is 1.5, if only a single transparent dielectric coating is deposited on the substrate made of vitreous material under just one attenuating layer, then it is not recommended for said coating or the coating placed adjacent the attenuating layer on the side opposite the light-absorbing functional layer to be made from $SiO_2$ (unless the latter coating is intended to make contact with air); however, $SiO_2$ may be suitable if the transparent dielectric coating is located elsewhere.

The external dielectric coating that is last in the stack and therefore furthest from the substrate is essentially a coating intended to protect the multilayer stack from various external physical and/or chemical aggressions and especially to protect the stack during a high-temperature heat treatment if such is the case. However, when an attenuating layer is located beside the external dielectric coating that is last in the stack, said external dielectric coating also has in association with the attenuating layer an interference function allowing the low light reflection to be obtained.

The dielectric layers are generally deposited by low-pressure magnetron cathode sputtering, but they may also be deposited by the well-known PECVD (plasma-enhanced chemical vapor deposition) technique. Each dielectric coating may be formed from a plurality of dielectric layers of different compositions.

Preferably, at least the transparent dielectric coatings that are external with respect to the stack in its entirety, i.e. the first transparent dielectric coating deposited on the substrate and the last transparent dielectric coating of the stack, and preferably all the transparent dielectric coatings of the stack, are based on silicon nitride or aluminum nitride, and advantageously mainly made of silicon nitride, i.e. made of more than 90%, or indeed 95% and even 98% silicon nitride. However, this does not exclude the possibility, as discussed below, that, for example, a thin layer acting as a barrier to alkali-metal ions or a thin final protective layer, for example made of a mixed Ti and Zr oxide, will be present on the substrate. The silicon nitride may be obtained in a conventional way from an optionally aluminum- or boron-doped silicon target by magnetron cathode sputtering in a reactive nitrogen and argon atmosphere. The silicon target is doped to give it the electrical conductivity required to carry out the cathode sputtering and for example doped with at most 10% by weight and for example between 2% and 4% by weight aluminum or boron. The silicon-nitride layers in the finished stack may be slightly oxidized over some of their thickness. These silicon nitride layers may also be richer in silicon than the theoretical stoichiometry. Silicon nitride and aluminum nitride effectively protect the metal layers from any exterior aggression and in particular protect the metal layers during high-temperature heat treatments, for example treatments at about 600 to 670° C. lasting 6 to 10 minutes, such treatments being necessary in processes, such as thermal tempering processes, used to mechanically strengthen the glazing substrate.

The light-absorbent functional layer and the attenuating layer may be of different materials. Preferably, both said layers are of identical composition.

Preferably, a second attenuating layer (advantageously of metallic character) having a thickness comprised between 1 and 50 nm and having a refractive index n higher than 1 and an attenuation coefficient k of at least 0.5, and an additional transparent dielectric coating the optical thickness of which is comprised between 30 and 160 nm and the refractive index n of which is higher than 1.5, unless it makes contact with air, are added on the other side of the light-absorbent functional layer with respect to the first attenuating layer, so that this additional transparent dielectric coating is on the other side of the second attenuating layer with respect to the light-absorbent functional layer. This arrangement allows a pleasant aesthetic appearance to be obtained when the panel is observed from both sides and therefore either from the side of the substrate or from the side of the multilayer stack. As regards the material and as regards the ranges of thicknesses, the preferences given for the first attenuating layer also apply without exception to this second attenuating layer. This embodiment may for example be as shown in table B of FIG. 1.

The invention also encompasses a glass panel comprising a substrate made of vitreous material bearing a multilayer stack including at least one light-absorbent functional layer and one attenuating layer, which layers are flanked by transparent dielectric coatings, characterized in that it has a light transmission of 2% or less and preferably 1% or less, a light reflection, observed from the side of the attenuating layer, of 6.5% or less, preferably 6% or less and advantageously 5.5% or less, and a neutral hue in reflection observed from the same side.

A glass panel according to the invention has a very pleasant novel aesthetic appearance.

Preferably, the light reflection attenuating-layer side is 5% or less and advantageously 4.5% or less.

The light-absorbent functional layer and the attenuating layers are deposited by low-pressure cathode sputtering and preferably low-pressure magnetron cathode sputtering. The dielectric layers are generally deposited by low-pressure magnetron cathode sputtering, but they may also be deposited by the well-known PECVD (plasma-enhanced chemical vapor deposition) technique. Each dielectric coating may be formed from a plurality of dielectric layers of different composition.

Preferably, the light-absorbent functional layer and the attenuating layer are formed from an alloy based on Ni, Cr, Zr or W and advantageously based on an alloy from the group NiCr, NiCrW and CrZr.

Preferably, the dielectric coatings are based on silicon nitride or aluminum nitride and advantageously essentially made of silicon nitride, i.e. made of more than 90%, or indeed 95% and even 98% silicon nitride.

Preferably, the a* and b* colour coordinates observed in reflection on the attenuating-layer side are both lower than 4, preferably 3 or less, advantageously lower than 1 and even than 0.5 in absolute value. This feature guarantees a neutral appearance in reflection that, combined with a very low reflection, creates a particularly aesthetic black appearance.

Preferably, the light reflection observed from at least one of the sides of the panel is 5.2% or less and advantageously 5% or less. The panel thus also has a pleasant aesthetic appearance from at least one side. Preferably, the light reflection observed from both sides of the panel is 5.2% or less and advantageously 5% or less.

The invention also encompasses a laminated panel comprising a glass sheet bearing a multilayer stack such as described above with which another glass sheet is associated by way of an adhesive thermoplastic.

Comparative Examples C1 to C4

In table I below, the four first examples not according to the invention included only a single metal layer and either two transparent dielectric coatings or just one (the case for example C3). The corresponding optical properties are indicated in table I. The light transmission ($T_L$) in % and light reflection ($R_L$) in % were measured with CIE-standard illuminant D65, 2°. The CIE, L*, a*, b* colour coordinates were measured with illuminant D65, 10°. The light reflection $R_{LG}$ and the $L*_{RG}$, $a*_{RG}$, $b*_{RG}$ colour coordinates were observed in reflection from the side of the substrate.

The multilayer stacks indicated in the table were deposited on an ordinary clear soda-lime glass sheet of 4 mm thickness by low-pressure magnetron cathode sputtering in a magnetron. The light-absorbent NiCrW metal layer was deposited in a neutral argon atmosphere using a metal target of an NiCrW alloy composed of 50% by weight NiCr (nickel/chromium in a proportion of 80/20, respectively) and 50% by weight tungsten. The $Si_3N_4$ nitride dielectric layers were deposited using a metallic silicon target doped with 4% aluminum, in a reactive argon and nitrogen atmosphere. The designation $Si_3N_4$ does not mean that the material was perfectly stoichiometric and it may have been slightly substoichiometric in nitrogen or slightly oxidized. The same went for the other nitrides. The same likewise went for the oxides ($SiO_2$, $TiO_2$), which were possibly also slightly substoichiometric in oxygen or slightly nitrided.

In the tables, the layers are shown from left to right in the order that they were deposited on the glass substrate. The indicated thicknesses are geometric thicknesses in nm.

TABLE I (comparative examples):

| Ex. | $Si_3N_4$ | NiCrW | $Si_3N_4$ | $T_L$ | $R_L$ | L* | a* | b* |
|---|---|---|---|---|---|---|---|---|
| C1 | 62.5 | 4.5 | 6.3 | 41 | 5 | 27.16 | 0.7 | −0.1 |
| C2 | 60 | 3 | 50 | 64 | 12 | 41.96 | 4.7 | −0.3 |
| C3 | — | 50 | 50 | 1.7 | 45 | 73 | 0.2 | 4.8 |
| C4 | 56.7 | 50 | 50 | 2.2 | 25.5 | 57.7 | 3.1 | 0.8 |

Examples C1 and C2 have a much too high light transmission for the intended application and were therefore unsuitable. Example C1 of course allows a low light reflection with a neutral hue to be obtained. However, apart from the fact that the light transmission was much too high, the second dielectric coating was also much too thin to obtain a durable product. The mechanical and chemical protection afforded was insufficient.

Examples C3 and C4 had a very low light transmission suitable for the intended application, but they had much too high a light reflection and were therefore unsuitable.

Examples 1 to 24 According to the Invention and Comparative Examples C5 to C8

In table II below, examples according to the invention are collated in the same format as the comparative examples in table I. Two comparative examples C5 to C8 are also shown. The layers were deposited under the same conditions and using the same technique, i.e. low-pressure magnetron cathode sputtering in a magnetron. The composition of the NiCrW layers was the same as in the comparative examples. The Al, Cu, Cr and Ti metallic layers were also deposited in a neutral argon atmosphere, using a metallic target made of the corresponding material. The TiN, CrN, TaN and ZrN nitride layers were deposited using a metallic target of the corresponding material, in a reactive argon and nitrogen atmosphere. The $TiO_2$ oxide layers were deposited using a ceramic TiOx target, in a reactive argon and oxygen atmosphere. The $SiO_2$ layers were deposited using a silicon target doped with 4% aluminum, in an oxidizing reactive argon and oxygen atmosphere. The SiON layer was deposited in a reactive argon and nitrogen atmosphere containing a little oxygen. The AZO layer was deposited using a ceramic aluminum-doped zinc-oxide target, in a neutral atmosphere. These multilayer stacks were also deposited on an ordinary clear soda-lime glass sheet of 4 mm thickness.

The mean attenuation coefficients k and refractive indices n, which were calculated as indicated above over the whole of the visible spectrum extending from 300 nm to 750 nm, are given in table III below.

The light transmission ($T_L$) in % and the light reflection ($R_L$) in % were measured with CIE-standard illuminant D65, 2°. The CIE L*, a* and b* colour coordinates were measured with illuminant D65, 10°. The light reflection $R_{LG}$ and the $L*_{RG}$, $a*_{RG}$, $b*_{RG}$ colour coordinates were observed in reflection from the side of the substrate. The light reflection $R_{LC}$ and the $L*_{RC}$, $a*_{RC}$, $b*_{RC}$ colour coordinates were observed in reflection from the side of the multilayer stack.

TABLE II (examples according to the invention and comparative examples C5 to C8):

| Ex. | $Si_3N_4$ | NiCrW | $Si_3N_4$ | NiCrW | $Si_3N_4$ | $T_L$ | $R_{LG}$ | $L*_{RG}$ | $a*_{RG}$ | $b*_{RG}$ |
|---|---|---|---|---|---|---|---|---|---|---|
| 1 | 56.3 | 7.2 | 50 | 50 | 50 | 0.5 | 4.3 | 24.7 | 0.1 | −0.3 |
| 2 | 43.9 | 9.3 | 47.5 | 36.9 | 30 | 1 | 6 | 29.8 | 3 | 3 |
| 3 | 33.7 | 7.6 | 49.2 | 39.1 | 30 | 1 | 6 | 29.8 | 3 | −3 |
| 4 | 51.6 | 5 | 52.2 | 44 | 32.5 | 1 | 6 | 29.8 | −3 | −3 |
| 5 | 60 | 5.3 | 53.4 | 44.3 | 36.6 | 1 | 6 | 29.8 | −2.8 | 3 |
| 6 | 56.4 | 7.1 | 50.2 | 63.8 | 50 | 0.2 | 4.3 | 24.7 | 0 | −0.3 |
| Ex. | $Si_3N_4$ | NiCrW | $Si_3N_4$ | Al | $Si_3N_4$ | $T_L$ | $R_{LG}$ | $L*_{RG}$ | $a*_{RG}$ | $b*_{RG}$ |
| 7 | 58.8 | 8.7 | 52.3 | 34 | 50 | 0.2 | 4.4 | 25 | 0.1 | −0.1 |
| Ex. | $Si_3N_4$ | NiCrW | $Si_3N_4$ | Ti | $Si_3N_4$ | $T_L$ | $R_{LG}$ | $L*_{RG}$ | $a*_{RG}$ | $b*_{RG}$ |
| 8 | 56.6 | 6.9 | 42 | 94.1 | 50 | 0.2 | 4.3 | 24.7 | 0 | −0.3 |
| Ex. | $Si_3N_4$ | Ti | $Si_3N_4$ | NiCrW | $Si_3N_4$ | $T_L$ | $R_{LG}$ | $L*_{RG}$ | $a*_{RG}$ | $b*_{RG}$ |
| 9 | 49.7 | 14.5 | 60.9 | 64.8 | 50 | 0.2 | 4.4 | 25 | 0.1 | −0.1 |
| Ex. | $Si_3N_4$ | Al | $Si_3N_4$ | NiCrW | $Si_3N_4$ | $T_L$ | $R_{LG}$ | $L*_{RG}$ | $a*_{RG}$ | $b*_{RG}$ |
| C5 | 47.9 | 3.4 | 81.9 | 66.8 | 50 | 0.4 | 10.6 | 38.9 | 4.2 | −1.7 |
| Ex. | $Si_3N_4$ | TiN | $Si_3N_4$ | NiCrW | $Si_3N_4$ | $T_L$ | $R_{LG}$ | $L*_{RG}$ | $a*_{RG}$ | $b*_{RG}$ |
| 10 | 45 | 29.1 | 37.4 | 64.6 | 50 | 0.2 | 4.9 | 26.4 | 0.4 | −0.2 |
| Ex. | $Si_3N_4$ | ZrN | $Si_3N_4$ | NiCrW | $Si_3N_4$ | $T_L$ | $R_{LG}$ | $L*_{RG}$ | $a*_{RG}$ | $b*_{RG}$ |
| 11 | 39.8 | 25 | 0 | 75.5 | 50 | 0.3 | 6 | 29.7 | 0 | −0.5 |
| Ex. | $TiO_2$ | NiCrW | $Si_3N_4$ | NiCrW | $Si_3N_4$ | $T_L$ | $R_{LG}$ | $L*_{RG}$ | $a*_{RG}$ | $b*_{RG}$ |
| 12 | 43.6 | 10.4 | 57.8 | 61.5 | 50 | 0.2 | 4.9 | 26.6 | 0.3 | −0.2 |
| Ex. | — | NiCrW | $Si_3N_4$ | NiCrW | $Si_3N_4$ | $T_L$ | $R_{LG}$ | $L*_{RG}$ | $a*_{RG}$ | $b*_{RG}$ |
| C6 | — | 5.1 | 49.4 | 59.7 | 50 | 0.4 | 6.7 | 31.2 | 5.9 | −0.5 |
| Ex. | SiON | NiCrW | $Si_3N_4$ | NiCrW | $Si_3N_4$ | $T_L$ | $R_{LG}$ | $L*_{RG}$ | $a*_{RG}$ | $b*_{RG}$ |
| 13 | 69.3 | 4.1 | 51.4 | 67.5 | 50 | 0.2 | 5 | 26.9 | 2.6 | −0.2 |
| Ex. | $Si_3N_4$ | NiCrW | $Si_3N_4$ | $TiO_2$ | NiCrW | $Si_3N_4$ | $T_L$ | $R_{LG}$ | $L*_{RG}$ | $a*_{RG}$ | $b*_{RG}$ |
| 14 | 56.9 | 5.8 | 37.4 | 68.4 | 50 | 0.2 | 4.6 | 25.5 | 0.3 | −0.1 |
| Ex. | $TiO_2$ | NiCrW | $TiO_2$ | NiCrW | $Si_3N_4$ | $T_L$ | $R_{LG}$ | $L*_{RG}$ | $a*_{RG}$ | $b*_{RG}$ |
| 15 | 42.2 | 9.9 | 40.5 | 64.4 | 50 | 0.2 | 4.7 | 25.8 | 0.1 | −0.2 |
| Ex. | $Si_3N_4$ | NiCrW | $SiO_2$ | NiCrW | $Si_3N_4$ | $T_L$ | $R_{LG}$ | $L*_{RG}$ | $a*_{RG}$ | $b*_{RG}$ |
| 16 | 54.3 | 8.2 | 80.1 | 55.6 | 50 | 0.2 | 4.3 | 24.7 | 0 | −0.4 |
| Ex. | $Si_3N_4$ | NiCrW | $Si_3N_4$ | NiCrW | $Si_3N_4$ | $T_L$ | $R_{LG}/R_{LC}$ | $L*_{RG}/L*_{RC}$ | $a*_{RG}/a*_{RC}$ | $b*_{RG}/b*_{RC}$ |
| 17 | 30 | 56.6 | 47.6 | 8.3 | 44.6 | 0.2 | 31.9/4 | 63/23.8 | 0.3/0 | 10.5/0.1 |
| Ex. | $Si_3N_4$ | NiCrW | $Si_3N_4$ | CrN | $Si_3N_4$ | $T_L$ | $R_{LG}$ | $L*_{RG}$ | $a*_{RG}$ | $b*_{RG}$ |
| 18 | 55.3 | 5.9 | 49.6 | 131.5 | 50 | 0.2 | 4.3 | 24.6 | 0 | −0.5 |
| Ex. | $Si_3N_4$ | W | $Si_3N_4$ | NiCrW | $Si_3N_4$ | $T_L$ | $R_{LG}$ | $L*_{RG}$ | $a*_{RG}$ | $b*_{RG}$ |
| 19 | 55.9 | 9 | 39.5 | 64.6 | 50 | 0.2 | 4.3 | 24.8 | 0 | −0.3 |
| Ex. | $Si_3N_4$ | Cu | $Si_3N_4$ | NiCrW | $Si_3N_4$ | $T_L$ | $R_{LG}$ | $L*_{RG}$ | $a*_{RG}$ | $b*_{RG}$ |
| C7 | 40.8 | 9.5 | 78.5 | 69.1 | 50 | 0.3 | 13.5 | 43.5 | 11.8 | −5 |

TABLE II-continued (examples according to the invention and comparative examples C5 to C8):

| Ex. | Si$_3$N$_4$ | Cr | Si$_3$N$_4$ | NiCrW | Si$_3$N$_4$ | T$_L$ | R$_{LG}$ | L*$_{RG}$ | a*$_{RG}$ | b*$_{RG}$ |
|---|---|---|---|---|---|---|---|---|---|---|
| Ex. 20 | Si$_3$N$_4$ 50.1 | Cr 10.1 | Si$_3$N$_4$ 68.4 | NiCrW 65.5 | Si$_3$N$_4$ 50 | T$_L$ 0.2 | R$_{LG}$ 4.5 | L*$_{RG}$ 25.4 | a*$_{RG}$ 0 | b*$_{RG}$ −0.2 |
| Ex. 21 | Si$_3$N$_4$ 46.7 | CrN 15.9 | Si$_3$N$_4$ 27.4 | NiCrW 65.9 | Si$_3$N$_4$ 50 | T$_L$ 0.2 | R$_{LG}$ 4.3 | L*$_{RG}$ 24.7 | a*$_{RG}$ 0 | b*R$_G$ −0.2 |
| Ex. C8 | Si$_3$N$_4$ 55.7 | AZO 161 | Si$_3$N$_4$ 126 | NiCrW 70.7 | Si$_3$N$_4$ 50 | T$_L$ 0.2 | R$_{LG}$ 8.9 | L*$_{RG}$ 35.6 | a*$_{RG}$ 0.8 | b*$_{RG}$ 0.3 |
| Ex. 22 | Si$_3$N$_4$ 51 | TaN 7.9 | Si$_3$N$_4$ 9.9 | NiCrW 77.4 | Si$_3$N$_4$ 50 | T$_L$ 0.2 | R$_{LG}$ 5.3 | L*$_{RG}$ 27.6 | a*$_{RG}$ 1 | b*$_{RG}$ −0.5 |
| Ex. 23 | TiO$_2$ 46.3 | NiCrW 10.4 | Si$_3$N$_4$ 57.8 | NiCrW 61.5 | Si$_3$N$_4$ 50 | T$_L$ 0.2 | R$_{LG}$ 4.9 | L*$_{RG}$ 26.6 | a*$_{RG}$ 0.3 | b*$_{RG}$ −0.2 |
| Ex. 24 | SiON 69.3 | NiCrW 4.1 | Si$_3$N$_4$ 51.4 | NiCrW 67.5 | Si$_3$N$_4$ 50 | T$_L$ 0.2 | R$_{LG}$ 5 | L*$_{RG}$ 26.9 | a*$_{RG}$ 2.6 | b*$_{RG}$ −0.2 |

Except for example 17, the attenuating layer is always in the third column of the table and the light-absorbent functional layer always in the fifth column of the table. In example 17, these two layers were inverted: the attenuating layer is in the fifth column and the light-absorbent functional layer is in the third column.

It will be noted that, in the examples according to the invention, a truly very low light transmission was obtained, the panel being almost opaque, and that the light reflection observed from the side of the substrate was also very low. Specifically, taking into account the reflection of light from the external surface of the glass sheet, which was about 4%, this meant that the light reflection of the multilayer stack was at most 2% and indeed lower than 1% in most of the examples. In addition, the hue in reflection on the substrate side was relatively neutral, thereby giving the panel a very aesthetic absorbent black appearance.

In variants of example 1, the thickness of the light-absorbent functional layer, in the fifth column of the table, was changed to 40 nm and to 65 nm, instead of 50 nm, thereby giving a light transmission (T$_L$) of 1% and 0.2%, respectively, all other properties remaining the same.

In the comparative examples C5 and C7, the attenuating layers, which were made of aluminum and of copper, respectively, had refractive indices lower than 1 (namely 0.9). It may be seen that the substrate-side light reflection was higher than 10%, this being unsatisfactory. In addition, the hue was not neutral and had an unacceptable red appearance.

In the comparative example C6, there was no dielectric coating between the substrate and the attenuating layer, having a refractive index higher than 1.5. It may be seen that the substrate-side light reflection was high and that the value of a* was also high. This was unsatisfactory because the aesthetic appearance that resulted was unsuitable.

In the comparative example C8, the attenuating layer was made of AZO the attenuation coefficient k of which was only 0.2 and therefore lower than 0.5. Despite an increase in the thickness of the dielectric interlayer between the light-absorbent functional layer and the attenuating layer, the substrate-side light reflection was higher than 6.5%. Therefore, a low light reflection was not obtained. In fact, AZO, despite having a very low absorption, is too transparent to be a suitable material for the attenuating layer: it rather forms a transparent dielectric layer that may be used as such, just like other transparent dielectric layers.

In contrast, it may be seen that with an attenuating layer formed by ZrN that has an attenuation coefficient k that is higher than 0.5 but nonetheless relatively low (1.1), a substrate-side light reflection of only 5.3 was obtained.

The attenuation coefficients and the refractive indices of the various materials such as used in the examples are given by way of indication in the following table:

TABLE III

| Material | n(350-750 nm) | k(350-750 nm) |
|---|---|---|
| NiCrW | 3.5 | 3.6 |
| SiN | 2.0 | 0.0 |
| Al | 0.9 | 6.1 |
| Ti | 1.9 | 2.6 |
| Cu | 0.9 | 3.2 |
| TiN | 2.1 | 1.4 |
| AZO | 2.7 | 0.2 |
| Cr | 1.8 | 3.6 |
| CrN | 3.1 | 1.8 |
| TaN | 5.2 | 1.1 |
| W | 3.5 | 2.7 |
| ZrN | 3.2 | 0.5 |
| TiO2 | 2.6 | 0.0 |
| SiO2 | 1.5 | 0.0 |

In example 17, the respective positions with respect to the substrate of the light-absorbent functional layer and the attenuating layer were inverted. It may be seen in this example that it was the stack-side light reflection that was very low with a neutral hue of black appearance. This panel according to example 17 was intended to be seen from the stack side and not from the substrate side as in examples 1-16. The stack is, for example, intended to be positioned in P1 (position 1 starting from the observer), or in P3 if it is placed in a laminated panel or in a double panel with a central space.

Example 25 According to the Invention

Example 25 related to a decorative panel intended to be observable from both sides and therefore either from the substrate side or from the multilayer-stack side. In this case, a second attenuating layer is placed on the other side of the light-absorbent functional layer with respect to the first attenuating layer. The structure of the stack is given in table IV:

TABLE IV

| Ex. | Si$_3$N$_4$ | NiCrW | Si$_3$N$_4$ | NiCrW | Si$_3$N$_4$ | NiCrW | Si$_3$N$_4$ |
|---|---|---|---|---|---|---|---|
| 25 | 56.7 | 7.2 | 50.8 | 43.4 | 44.8 | 8.4 | 48.3 |

The light-absorbent functional layer is in the fifth column and the attenuating layers are in the third and seventh columns.

The optical properties that resulted are given in table V:

TABLE V

| Ex. | $T_L$ | $R_{LG}$ | $L^*_{RG}$ | $a^*_{RG}$ | $b^*_{RG}$ | $R_{LC}$ | $L^*_{RC}$ | $a^*_{RC}$ | $b^*_{RC}$ |
|---|---|---|---|---|---|---|---|---|---|
| 25 | 0.2 | 4.3 | 24.8 | 0 | −0.3 | 4 | 23.7 | 0 | 0 |

It may be seen that for example 25 according to the invention, a very low light reflection and a neutral hue were obtained both on the stack side and on the substrate side.

Needless to say, the invention is not limited to the implementation examples mentioned in the present description.

Examples 26 and 27 According to the Invention

As table VI shows, in example 26 the dielectric coatings were made of $SnO_2$ and the attenuating layers of NiCr; and in example 27, the dielectric coatings were made of $Zn_2SnO_4$ and the attenuating layers of NiCr.

TABLE VI

| Ex. | $SnO_2$ | NiCr | $SnO_2$ | NiCr | $SnO_2$ |
|---|---|---|---|---|---|
| 26 | 56.7 | 7.2 | 50.8 | 43.4 | 44.8 |

| Ex. | $Zn_2SnO_4$ | NiCr | $ZSO_5$ | NiCr | $Zn_2SnO_4$ |
|---|---|---|---|---|---|
| 27 | 57.8 | 7.4 | 56.8 | 50.0 | 50.0 |

As may be seen in table VII below, with examples 26 and 27 according to the invention a truly very low light transmission was also obtained, the panel being almost opaque, and the light reflection observed from the side of the substrate was also very low. Specifically, taking into account the reflection of light from the external surface of the glass sheet, which is about 4%, this means that the light reflection of the multilayer stack was lower than 1%. In addition, the hue in reflection on the substrate side was relatively neutral, thereby giving the panel a very aesthetic absorbent black appearance.

TABLE VII

| Ex. | $T_L$ | $R_{LG}$ | $L^*_{RG}$ | $a^*_{RG}$ | $b^*_{RG}$ | $R_{LC}$ | $L^*_{RC}$ | $a^*_{RC}$ | $b^*_{RC}$ |
|---|---|---|---|---|---|---|---|---|---|
| 26 | 0.7 | 4.8 | 26.1 | −0.3 | −0.3 | 10.1 | 39.0 | 13.3 | −27.8 |
| 26 | 0.7 | 4.8 | 26.1 | −0.3 | −0.3 | 10.1 | 39.0 | 13.3 | −27.8 |
| 27 | 0.6 | 4.5 | 25.3 | 0.1 | −0.1 | 15.8 | 46.6 | 15.3 | −1.1 |

The invention claimed is:

1. An almost opaque decorative glass panel, comprising a substrate made of vitreous material bearing a multilayer stack including at least one light-absorbent functional layer and transparent dielectric coatings such that the light-absorbent functional layer is enclosed between dielectric coatings, wherein:
the light-absorbent functional layer has a geometric thickness between 15 and 140 nm, an attenuation coefficient k of at least 1.8 and a product of the attenuation coefficient k by a geometric layer thickness in nanometers of the light-absorbing functional layer of at least 91;
the multilayer stack in addition comprises at least one attenuating layer having a geometric thickness between 1 and 50 nm and having a refractive index n higher than 1 and an attenuation coefficient k of at least 0.5;
a transparent dielectric coating an optical thickness of which is between 30 and 160 nm, and a refractive index n of which is higher than 1.5 unless the transparent dielectric coating makes contact with air, is placed adjacent the attenuating layer on a side opposite the light-absorbent functional layer;
the attenuating layer does not comprise aluminium, and the glass panel has a reflectivity of 6% or less on the substrate side.

2. The decorative panel according to claim 1, wherein the light-absorbent functional layer is a layer of metallic character.

3. The decorative panel according to claim 1, wherein the attenuating layer is a layer of metallic character.

4. The decorative panel according to claim 1, wherein the attenuating layer is separated from the light-absorbent functional layer by a transparent dielectric coating.

5. The decorative substrate according to claim 1, wherein the geometric thickness of the light-absorbent functional layer is at most 88 nm.

6. The decorative panel according to claim 1, wherein the geometric thickness of the light-absorbent functional layer is 28 nm or more.

7. The decorative panel according to claim 1, wherein the geometric thickness of the attenuating layer is 30 nm or less.

8. The decorative panel according to claim 1, wherein a product of the attenuation coefficient k by the refractive index n and by the geometric thickness, expressed in nm, of the attenuating layer is higher than 35.

9. The decorative panel according to claim 1, wherein the optical thickness of said dielectric coating placed adjacent the attenuating layer on the side opposite the light-absorbent functional layer is between 50 and 140 nm.

10. The decorative panel according to claim 1, wherein:
the geometric thickness of the light-absorbent functional layer is between 25 and 70 nm;
the geometric thickness of the attenuating layer is between 1 and 15 nm; and
the optical thickness of said dielectric coating placed adjacent the attenuating layer on the side opposite the light-absorbent functional layer is between 40 and 160 nm.

11. The decorative panel according to claim 1, wherein the light-absorbent functional layer and/or the attenuating layer is/are formed from an alloy based on Ni, Cr, Zr or NiCr.

12. The decorative panel according to claim 11, wherein the light-absorbent functional layer and/or said attenuating layer is/are based on an alloy from the group consisting of NiCr, NiCrW, NbZr and CrZr.

13. The decorative panel according to claim 1, wherein at least the transparent dielectric coatings external with respect to the stack in its entirety are based on aluminum nitride or silicon nitride.

14. The decorative panel according to claim 1, wherein a second attenuating layer, having a geometric thickness between 1 and 50 nm, having a refractive index n higher than 1 and an attenuation coefficient k of at least 0.5, and an additional transparent dielectric coating an optical thickness of which is between 30 and 160 nm, and a refractive index n of which is higher than 1.5 unless the additional transparent dielectric coating makes contact with air, are added on an other side of the light-absorbent functional layer with respect to the first attenuating layer, so that this additional transparent dielectric coating is on the other side of the second attenuating layer with respect to the light-absorbent functional layer.

15. A laminated panel, comprising a decorative panel according to claim 1, with which another glass sheet is associated by way of an adhesive thermoplastic.

16. A laminated panel, comprising a glass panel according to claim 14, with which another glass sheet is associated by way of an adhesive thermoplastic.

17. The decorative panel according to claim 1, wherein the light-absorbent functional layer comprises at least one member selected from the group consisting of NiCrW, Al, Ti and CrN.

18. The decorative panel according to claim 1, wherein the attenuating layer comprises at least one member selected from the group consisting of W, NiCrW, Ti, TiN, ZrN, Cr, CrN and TaN.

19. The decorative panel according to claim 1, wherein the light-absorbent functional layer has a geometric thickness of 34 to 131.5 nm, and an attenuation coefficient k of 1.8 to 3.6.

20. An almost opaque decorative glass panel, comprising a substrate made of vitreous material bearing a multilayer stack, the multi-layer stack comprising:
   a light-absorbent functional layer;
   transparent dielectric coatings that enclose the light-absorbent functional layer between the dielectric coatings; and
   an attenuating layer having a geometric thickness between 1 and 50 nm and having a refractive index n higher than 1 and an attenuation coefficient k of at least 0.5, wherein one transparent dielectric coating having an optical thickness of between 30 and 160 nm, and a refractive index n of higher than 1.5 unless the one transparent dielectric coating makes contact with air, is adjacent the attenuating layer on a side opposite the light-absorbent functional layer, wherein the light-absorbent functional layer has a geometric thickness between 15 and 140 nm, an attenuation coefficient k of at least 1.8 and a product of the attenuation coefficient k by the layer thickness in nanometers of at least 91, wherein the attenuating layer comprises a material selected from the group consisting of titanium, niobium, chromium, molybdenum, zirconium, tantalum, palladium, yttrium, tungsten, hafnium, vanadium or alloys thereof, and wherein the glass panel has a reflectivity of no more than 6% on the substrate side.

* * * * *